(12) United States Patent
Belani et al.

(10) Patent No.: US 6,772,350 B1
(45) Date of Patent: Aug. 3, 2004

(54) SYSTEM AND METHOD FOR CONTROLLING ACCESS TO RESOURCES IN A DISTRIBUTED ENVIRONMENT

(75) Inventors: Eshwar Belani, San Jose, CA (US); Dinesh Katiyar, Redwood City, CA (US); Suneet Garg, Sunnyvale, CA (US)

(73) Assignee: E.Piphany, Inc., San Mateo, CA (US)

( * ) Notice: Subject to any disclaimer, the term of this patent is extended or adjusted under 35 U.S.C. 154(b) by 0 days.

(21) Appl. No.: 09/312,019

(22) Filed: May 14, 1999

Related U.S. Application Data

(60) Provisional application No. 60/085,534, filed on May 15, 1998.

(51) Int. Cl.[7] .................................................. H04L 9/32
(52) U.S. Cl. ............................ 713/202; 707/9; 709/229
(58) Field of Search ................................ 713/200–202; 709/223, 226, 227, 229; 707/1, 9, 10, 100, 103, 103 Y, 103 Z, 103 R

(56) References Cited

U.S. PATENT DOCUMENTS

| | | | |
|---|---|---|---|
| 5,187,787 A | | 2/1993 | Skeen et al. |
| 5,257,369 A | | 10/1993 | Skeen et al. |
| 5,335,346 A | * | 8/1994 | Fabbio .......................... 395/600 |
| 5,475,587 A | * | 12/1995 | Anick et al. .................... 704/9 |
| 5,557,798 A | | 9/1996 | Skeen et al. |

(List continued on next page.)

OTHER PUBLICATIONS

"Department of Defense Trusted Computer System Evaluation Criteria,", Department of Defense Standard, http://www.cs.berkeley.edu/~daw/cl...l/reading/orange–book–excerpts.txt, Dec. 1985, pp. 1–13.

(List continued on next page.)

Primary Examiner—Ayaz Sheikh
Assistant Examiner—Christopher Revak
(74) Attorney, Agent, or Firm—Bingham McCutchen LLP; Fabio E. Marino

(57) ABSTRACT

A distributed access controller for controlling access to resources in a multi-domain distributed computing environment. The access controller is configured to receive a request from a user requesting performance of one or more operations on a particular resource. The access controller attempts to resolve the requested operations based on user hierarchy information and access list information for the particular resource. If all the operations in the user's request cannot be resolved based on the user hierarchy information and the access list information for the particular resource, the access controller then attempts to resolve the unresolved operations based on the particular user's user hierarchy information in combination with resource hierarchy information, and access list information for the resources in the resource hierarchy information. In alternate embodiments, the access controller attempts to resolve the requested operations based on the resource hierarchy information and access list information for the resources in the resource hierarchy information. If all the operations in the user's request cannot be resolved based on the resource hierarchy information and the access list information for the resources in the resource hierarchy information, the access controller then attempts to resolve the unresolved operations based on the resource hierarchy information in combination with the particular user's user hierarchy information, and the access list information for the resources in the resource hierarchy information.

28 Claims, 8 Drawing Sheets

U.S. PATENT DOCUMENTS

| | | | |
|---|---|---|---|
| 5,778,185 A | | 7/1998 | Gregerson et al. |
| 5,787,427 A | * | 7/1998 | Benantar et al. ................ 707/9 |
| 5,826,250 A | * | 10/1998 | Trefler .......................... 706/50 |
| 5,878,415 A | * | 3/1999 | Olds ............................. 707/9 |
| 5,878,420 A | | 3/1999 | de la Salle |
| 5,956,715 A | * | 9/1999 | Glasser et al. ................. 707/9 |
| 5,970,490 A | * | 10/1999 | Morgenstern ................ 707/10 |
| 6,047,377 A | * | 4/2000 | Gong ......................... 713/200 |
| 6,061,684 A | * | 5/2000 | Glasser et al. ................. 707/9 |
| 6,105,027 A | * | 8/2000 | Schneider et al. ............ 707/9 |
| 6,173,404 B1 | * | 1/2001 | Colburn et al. ............ 713/200 |
| 6,202,066 B1 | * | 3/2001 | Barkley et al. ................ 707/9 |
| 6,308,173 B1 | * | 10/2001 | Glasser et al. ................. 707/9 |
| 6,408,336 B1 | * | 6/2002 | Schneider et al. .......... 709/229 |
| 6,438,549 B1 | * | 8/2002 | Aldred et al. .................. 707/9 |

OTHER PUBLICATIONS

Belani, E. et al.,"The CRISIS Wide Area Security Architecture", 7th USENIX Security Symposium, Jan. 1998, 15 pages.

Abadi, M. et al., "A Calculus for Access Control in Distributed Systems", ACM Trans. on Programming Lang. and Systems, vol. 15, No. 3, Sep. 1993, pp. 1–29.

Lampson, B. et al., "Authentication in Distributed Systems: Theory and Practice", ACM, 1992, pp. 1–47.

* cited by examiner

| Resource | Users/Groups | Operations Permissions | | | |
|---|---|---|---|---|---|
| | | | $O_1$ | $O_2$ | $O_3$ |
| R | U1 | Positive | 1 | 0 | 0 |
| | | Negative | 0 | 1 | 0 |
| | U2, G1 | Positive | 1 | 1 | 0 |
| | | Negative | 0 | 0 | 0 |
*Fig. 3*
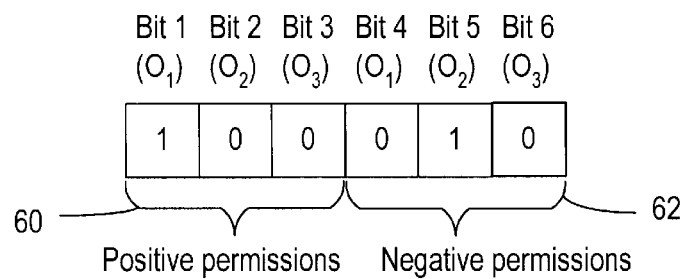
*Fig. 4*
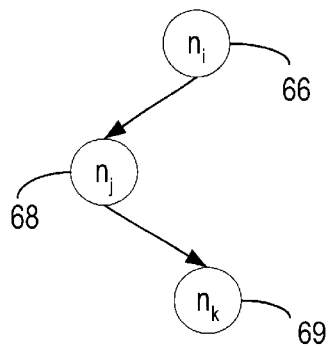
*Fig. 5*

SYSTEM AND METHOD FOR CONTROLLING ACCESS TO RESOURCES IN A DISTRIBUTED ENVIRONMENT

CROSS-REFERENCES TO RELATED APPLICATIONS

This application claims priority from U.S. Provisional Patent Application No. 60/085,534, entitled "APPARATUS & METHOD FOR A DISTRIBUTED MESSAGING FRAMEWORK BASED ON NETWORK ADDRESSABLE SEMANTICALLY INTERPRETABLE BYTE SETS AND DATA PLACES TO PROVIDE AUTOMATIC DATA DEFINITION MANAGEMENT, PERSISTENCE, AND ROUTING OF STRUCTURED INFORMATION ACROSS NETWORKED PROCESSES," filed May 15, 1998, the entire disclosure of which is herein incorporated by reference for all purposes.

This application incorporates by reference in its entirety for all purposes U.S. patent application Ser. No. 09/283,264, entitled "USER INTERFACE FOR A DISTRIBUTED MESSAGING FRAMEWORK BASED ON NETWORK ADDRESSABLE SEMANTICALLY INTERPRETABLE BYTE SETS AND DATA PLACES TO PROVIDE AUTOMATIC DATA DEFINITION MANAGEMENT, PERSISTENCE, AND ROUTING OF STRUCTURED INFORMATION ACROSS NETWORKED PROCESSES" filed, Apr. 1, 1999.

The following patent applications, including this one, are being filed concurrently, and the disclosure of each other application is hereby incorporated by reference in its entirety into this application for all purposes.

Patent application Ser. No. 09/594,869 entitled "SYSTEM AND METHOD FOR CONTROLLING ACCESS TO RESOURCES IN A DISTRIBUTED ENVIRONMENT";

Patent application Ser. No 09/312,194, entitled SYSTEM AND METHOD FOR PUBLISHING INFORMATION FROM SEMI-STRUCTURED INFORMATION STORES";

Patent application Ser. No. 09/312,129, entitled, "EXTENSIBLE USER INTERFACE FOR A DISTRIBUTED MESSAGING FRAMEWORK IN A COMPUTER NETWORK" which is now U.S. Pat. No. 6,567,846;

Patent application Ser. No. 09/311,908, entitled "AUGMENTED PROCESSING OF INFORMATION OBJECTS IN A DISTRIBUTED MESSAGING FRAMEWORK IN A COMPUTER NETWORK"; and Patent application Ser. No. 09/312,131, entitled "PUBLISH-SUBSCRIBE ARCHITECTURE USING INFORMATION OBJECTS IN A COMPUTER NETWORK" which is now U.S. Pat. No. 6,567,846.

BACKGROUND OF THE INVENTION

The present invention relates to the field of computer security and more particularly to techniques for controlling access to resources in a multi-domain distributed computing environment.

Advances in communication network technologies coupled with the explosive growth in the usage of computer systems have significantly increased the number of resources available to users via communication networks. Due to the rising popularity of such communication networks, an increasing number of enterprises are replacing their legacy centralized information processing models with distributed systems comprising a plurality of computer systems interconnected via a communication network, such as the Internet. The use of such distributed systems has allowed enterprises to transcend geographical boundaries and share resources between a multitude of users irrespective of the physical location of the users. For example, an enterprise having offices in Seattle, Denver, and San Francisco may have a distributed computer network which allows users in any of the three offices to access resources deployed at the other office locations. Distributed computer networks allow efficient sharing of resources among users of the distributed system in a seamless manner. Examples of resources that may be shared include information resources such as databases, files, etc., or operational resources such as devices or processes.

The increased deployment of resources via distributed networks has led to a heightened awareness of security concerns regarding the need to protect the resources from unauthorized access. Several security models have been developed to control access to resources. These models typically include a "principal" who requests an operation to be performed on a particular resource, and an "access controller" who receives the request from the principal and based on the request determines if the requesting principal is authorized to perform the requested operation on the resource. Access rights for a resource are generally defined by access rules associated with the resource. The access rules indicate the principals and the operations which may be performed on the resource. The requesting principal is allowed to perform the requested operation on the requested resource if authorized by the access rule.

Several access control systems have been developed based on the security model described above which use mechanisms such as user groups, access lists, capability lists, and lock-key mechanisms to regulate access rights to resources. With the ever-increasing use of distributed systems, the success or failure of such systems in a distributed environment is typically measured by the system's ease of use, the access control granularity offered by the system, and the scalability of the system with respect to the number of users, resources, operations to be performed on the resources, and the number of requests. While many of the conventional systems listed above are well suited for centralized processing models, they do not always fare as well when used in a distributed environment. In particular, these conventional access control systems do not provide the desired ease of use, access control granularity, and scalability in a distributed environment. As a result, many of these systems are difficult to use and administer and do not scale well as the number of resources, requests, and users increases.

Thus, there is a need for an access control system which can efficiently control access to resources in a distributed environment. It is desired that the system be easy to use and administer, provide fine grained access control granularity, and be easily scalable as the number of principals and resources increases.

SUMMARY OF THE INVENTION

The present invention provides techniques for controlling access to resources in a distributed environment. According to one embodiment of the present invention, an access controller executing on a server is responsible for controlling access to one or more resources coupled with the server. The access controller is configured to receive a request from a particular user requesting performance of one or more operations on a particular resource. The access controller attempts to resolve permissions for the operations in the request based on access list information for the particular resource and user hierarchy information for the requesting user. An operation is considered resolved if permissions have been specifically asserted for the operation.

According to one embodiment of the present invention, the access controller determines if permissions have been asserted for the requested operations in the access list information of the particular resource for the particular user. If the permissions are not resolved for all the requested operations, the access controller attempts to resolve permissions for the unresolved operations by tracing up the user hierarchy information for the user to determine if permissions have been asserted for the unresolved operations for any of the user's ancestors in the access list information of the particular resource. If permissions have been asserted for the user's ancestors, those permissions are attributed to the user and the particular operations for which the permissions have been asserted are considered resolved.

According to another embodiment of the present invention, if all operations cannot be resolved based the user hierarchy information and the access list information for the particular resource, the access controller attempts to resolve the unresolved operations based on the particular user's user hierarchy information in combination with resource hierarchy information and access list information for the resources in the resource hierarchy information.

According to one embodiment, if all the operations in the user's request cannot be resolved based on the user hierarchy information and the access list information for the particular resource, the access controller attempts to resolve the unresolved operations by tracing up the resource hierarchy information to determine ancestor resources of the particular resource, and then determining if permissions have been ,asserted for the unresolved operations in the access list information for any one of the ancestor resources for principals in the particular user's user hierarchy information. If permissions have been asserted, those permissions are attributed to the particular user for the resolved operations on the particular resource.

According to another embodiment of the present invention, the access controller attempts to resolve the requested operations based on the resource hierarchy information and access list information for the resources in the resource hierarchy information. If all the operations in the user's request cannot be resolved based on the resource hierarchy information and the access list information for the resources in the resource hierarchy information, the access controller then attempts to resolve the unresolved operations based on the resource hierarchy information in combination with the particular user's user hierarchy information, and the access list information for the resources in the resource hierarchy information.

According to one embodiment of the present invention, positive or negative permissions may be asserted for an operation in the access list information of a resource for a user. A positive permission may indicate that the user is specifically authorized to perform the operation on the resource. A negative permission may indicate that the user is specifically prohibited from performing the operation on the resource.

The invention will be better understood by reference to the following detailed description and the accompanying figures.

BRIEF DESCRIPTION OF THE DRAWINGS

FIG. 3 depicts an example of access control information according to an embodiment of the present invention;

FIG. 4 depicts a technique for storing operations permissions information using a binary integer according to an embodiment of the present invention;

FIG. 5 depicts a simple directed acyclic graph;

DESCRIPTION OF THE SPECIFIC EMBODIMENTS

Figure 1:
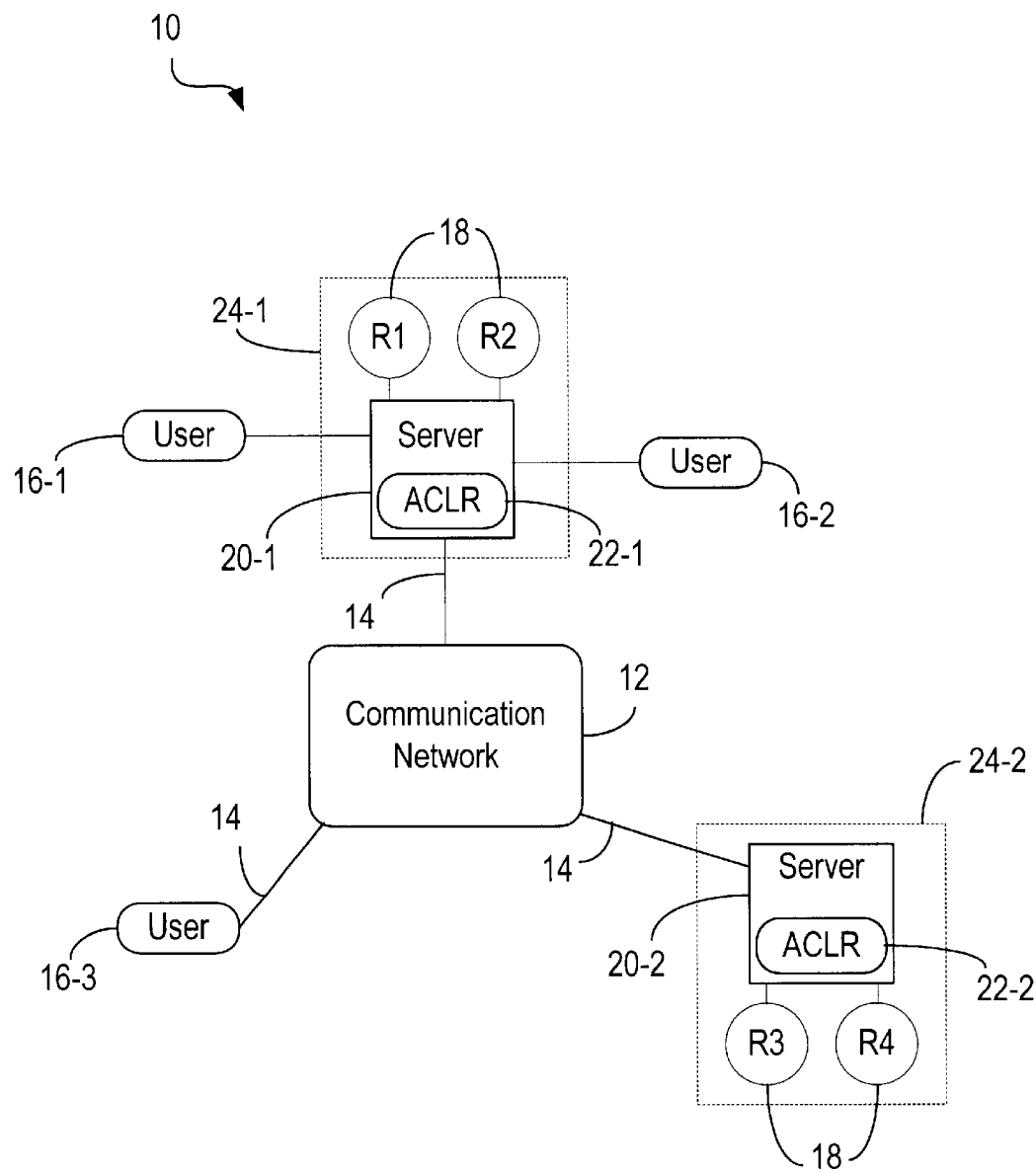
FIG. 1 depicts a simplified block diagram of a distributed computer network incorporating an embodiment of the present invention.

FIG. 1 depicts a simplified block diagram of a distributed computer network 10 embodying the access control mechanism of the present invention. As shown, distributed computer network 10 comprises a plurality of resources and computer systems coupled with a communication network 12. The computer systems include both user systems 16 and server systems 20. Resources 18 are typically coupled to one or more servers 20 which control access to the resources. For example, in FIG. 1, access to resources "R1" and "R2" is controlled by server 20-1, and access to resources "R3" and "R4" is controlled by server 20-2. User systems 16 may be coupled with the servers, for example user system 16-1, or alternatively may be coupled with communication network 12, for example user system 16-3. The servers and user systems are typically connected to communication network 12 via communication links 14. Communication network 12 provides a mechanism allowing servers 20 and user systems 16 to communicate and exchange information with each other. Communication network 12 also allows users to access resources deployed in computer network 10. An example of communication network 12 is the Internet, although the present invention is not limited to the Internet. Examples of resources include information resources such as databases, files, etc., or operational resources such as devices or processes.

It should be obvious to one of ordinary skill in the art that computer network 10 depicted in FIG. 1 is merely illustrative of an embodiment of the present invention and does not in any manner limit the scope of the present invention. Alternate embodiments of a distributed computer network known to those of ordinary skill in the art are also within the scope of the present invention.

As previously stated, servers 20 may control and coordinate accesses to resources coupled with the servers. Further, a server along with resources coupled to the server may be grouped together to form a logical group or a "domain." Accordingly, FIG. 1 depicts two domains 24-1 and 24-2 comprising server 20-1 and resources "R1" and "R2", and server 20-2 and resources "R3" and "R4", respectively. Although the domains depicted in FIG. 1 comprise only one server system, a domain may comprise one or more servers controlling access to one or more resources. A resource is typically uniquely identified within the domain by resource identification information. The resource identification information generally uniquely identifies a resource within a particular domain.

The task of controlling access to resources within a domain may be allocated to a selected server or may alternatively be distributed among one or more servers belonging to the domain. Servers which control resources generally comprise an access controller module 22 (ACLR) which performs the various functions and tasks for controlling access to the resources.

User systems 16 provide a mechanism for users or principals to generate requests requesting access to resources 18 deployed in computer network 10. The access requests typically comprise one or more operations that the principal requests to be performed on one or more resources. The principals may be users of user systems or even processes and programs executing on a user system and requesting operations to be performed on a specified resource. The request may be sent directly to the controlling server if the user system is coupled with the controlling server or alternatively may be routed to the controlling server via communication network 12. ACLR 22 on the controlling server receives the requests, and determines if the operations requested by the user can be performed on the requested resource.

Figure 2:
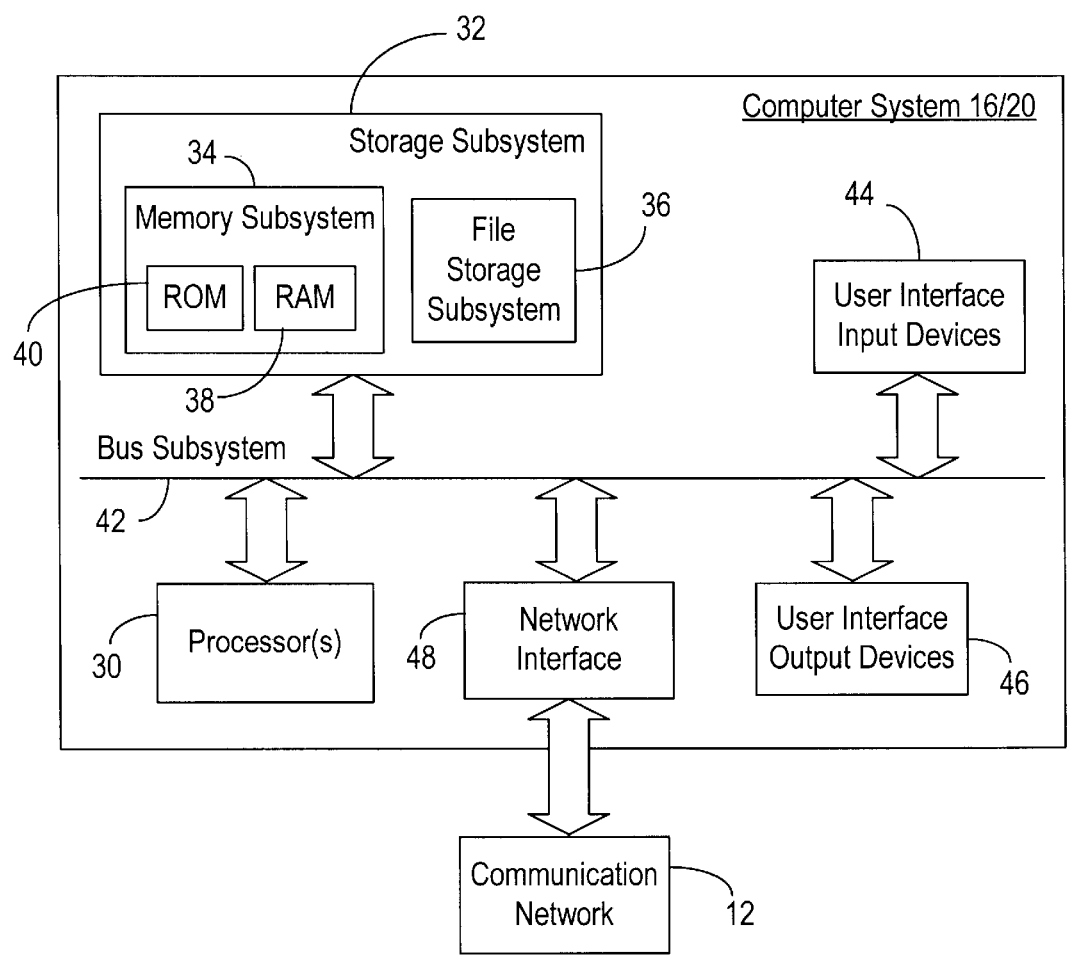
FIG. 2 depicts a simplified block diagram of a computer system according to an embodiment of the present invention.

FIG. 2 is a simplified block diagram of a computer system which may serve as a user system 16 or as a server system 20 according to an embodiment of the present invention. Computer system 16/20 typically includes at least one processor 30 which communicates with a number of peripheral devices via bus subsystem 42. These peripheral devices typically include a storage subsystem 32, comprising a memory subsystem 34 and a file storage subsystem 36, user interface input devices 44, user interface output devices 46, and a network interface subsystem 48. The input and output devices allow human interaction with computer system 16/20. Network interface subsystem 48 provides an interface to outside networks, including an interface to communication network 12, and is coupled via communication network 12 to corresponding interface devices in other server and client systems.

User interface input devices 44 may include a keyboard, pointing devices such as a mouse, trackball, touchpad, or graphics tablet, a scanner, a touchscreen incorporated into the display, audio input devices such as voice recognition systems, microphones, and other types of input devices. In general, use of the term "input device" is intended to include all possible types of devices and ways to input information into a computer system or onto a network.

User interface output devices 46 may include a printer, a display subsystem, a fax machine, or non-visual displays such as audio output devices. The display device may be a cathode ray tube (CRT), a flat-panel device such as a liquid crystal display (LCD), or a projection device. The display subsystem may also provide non-visual display such as audio output devices. In general, use of the term "output device" is intended to include all possible types of devices and ways to output information from a computer system to a human or to another machine.

Storage subsystem 32 stores the basic programming and data constructs that provide the functionality of the various systems embodying the present invention. For example, software modules implementing the present invention including ACLR 22, and access list information associated with the various resources may be stored in storage subsystem 32. The software modules are generally executed by processor 30. In a distributed environment, the software modules may be executed by processors located in different computer systems. Storage subsystem 32 typically comprises memory subsystem 34 and file storage subsystem 36.

Memory subsystem 34 typically includes a number of memories including a main random access memory (RAM) 38 for storage of instructions and data during program execution and a read only memory (ROM) 40 in which fixed instructions are stored. File storage subsystem 36 provides persistent (non-volatile) storage for program and data files, and may include a hard disk drive, a floppy disk drive along with associated removable media, a Compact Digital read Only Memory (CD-ROM) drive, an optical drive, or removable media cartridges. One or more of the drives may be located at remote locations on other connected computers at another site on computer network 10. Information resources such as databases and files may also be stored by file storage subsystem 36.

Bus subsystem 42 provides a mechanism for letting the various components and subsystems of computer system 16/20 communicate with each other as intended. The various subsystem and components of computer system 16/20 need not be at the same physical location but may be distributed at various locations within distributed computer network 10. Although bus subsystem 42 is shown schematically as a single bus in FIG. 2, further embodiments of the bus subsystem may utilize multiple busses.

Computer system 16/20 itself can be of varying types including a personal computer, a portable computer, a workstation, a mainframe, or other data processing systems. Due to the ever-changing nature of computers and networks, the description of computer system 16/20 depicted in FIG. 2 is intended only as a specific example for purposes of illustrating the preferred embodiment of the present invention. Many other configurations of computer system 16/20 are possible having more or less components than the computer system depicted in FIG. 2. User systems 16 and server systems 20 have the same general configuration, although user systems 16 typically have less storage and less processing capability than server systems 20.

According to an embodiment of the present invention, server 20 controls access to a particular resource based on access list information associated with the resource, resource hierarchy information for resources controlled by the server, and user hierarchy information. The different types of information are usually configured by a system administrator responsible for administering access to the resources for the particular domain or computer network. Further details on each type of information is provided below. The access list, resource hierarchy, and user hierarchy information is generally stored on server system 20 or is accessible to server 20 via communication network 12.

Access list information is typically associated with each resource in a domain and identifies users which are allowed to access the resource, and the operations which the users are authorized to perform on the resource. The operations that can be performed on a resource depend on the type of the resource. For example, if the resource was a file or database or any other data storage means, the operations which can be performed on the resource may include read, write, publish, subscribe, edit, delete, update, etc.

FIG. 3 depicts an exemplary access list information 50 for a resource "R" organized in a table format. As shown, access list information 50 identifies the resource R in the first column 52. The second column 54 identifies the users or groups which are allowed to perform operations on resource "R." The third column 56 identifies the various operations that may be performed on resource "R" and permissions associated with the operations for the various users. For each operation, a user or group may be granted "positive" permission or "negative" permission. A "positive" permission indicates that the user is specifically authorized to perform the operation on resource "R." A "negative" permission on the other hand indicates that the user is specifically prohibited from performing the operation on resource R. As shown in FIG. 3, a "1" value may be used to assert positive and negative permissions. A "0" value indicates that the positive or negative permission has not been asserted for the operation. In situation where both the positive and negative permissions have been asserted for an operation, ACLR 22 may be programmed to select one of the two permissions as the permission for the operations. For example, ACLR 22 may be programmed to interpret the setting of both permissions to imply that a positive permission has been asserted. Positive and negative access permissions provide the desired granularity of resource access control in a distributed system.

According to the access list information 50 depicted in FIG. 3, user "U1" has been granted positive permissions to perform operation $O_1$ but is prohibited from performing operation $O_2$ on resource "R." Further, it is unclear if user "U1" can perform operation $O_3$ on resource "R" since neither the positive permission nor the negative permission has been asserted for that operation for user "U1." Likewise, user "U2" and group "G1" have been granted positive permissions to perform operation $O_1$ and $O_2$, but no assertions have been made with respect to their permissions regarding operation $O_3$ on resource "R."

According to a specific embodiment, an integer represented in binary format may be used to store the positive and negative operations permissions information for a user or group. For example, as shown in FIG. 4, a 6-bit binary representation of an integer may be used to represent the operations permissions for operations $O_1$, $O_2$, and $O_3$ depicted in FIG. 3. A first section 60 of the integer can store information for the positive permissions while a second section 62 of the integer can store information for the negative permissions. Each bit of the first and second sections corresponds to an operation. For example, in FIG. 4, bit 1 stores information regarding the positive permissions and bit 4 stores information regarding the negative permissions for operation $O_1$. Likewise, bit 2 stores information regarding the positive permissions and bit 5 stores information regarding the negative permissions for operation $O_2$, and bit 3 stores information regarding the positive permissions and bit 6 stores information regarding the negative permissions for operation $O_3$. A positive or negative permission may be asserted by setting the corresponding bit to "1." A bit value of "0" indicates that the particular access permission has not been asserted. Accordingly, the integer bit value depicted in FIG. 4 corresponds to the permissions for user "U1" in FIG. 3. It should be apparent to one of ordinary skill in the art that the implementation shown in FIG. 4 is merely illustrative of one embodiment of representing operations permissions in the present invention. Alternate representations using integers or any other representation mechanisms are also within the scope of the present invention.

It should be apparent to one of ordinary skill in the art that the format of the access list information as shown in FIG. 3 merely illustrates one embodiment of the present invention and does not in any manner limit the scope of the present invention. Further, the access list information may be implemented in various other ways known to those skilled in the art. Other configurations of access list information are also possible having more or less information than that shown in FIG. 3. Additionally, for a particular domain, the operation which can be performed on one resource may vary from the operations which can be performed on other resources.

In addition to access list information, according to the present invention, the resources within a domain themselves may be configured in a hierarchical relationship. The resource hierarchy information is accessible to ACLR 22 executing on the server, and describes the hierarchical relationship between the resources and may be used by server 20 to determine if a user is allowed to perform an operation on a resource. In one embodiment, the resource hierarchy information may be represented by a directed acyclic graph (DAG) wherein the nodes of the DAG represent the various resources in the domain.

According to graph theory, a DAG may be represented by G(N,E) having nodes "N" and directed edges "E." FIG. 5 depicts an exemplary DAG having three nodes $n_i$, $n_j$, and $n_k$. A directed edge from a first node to a second node indicates a particular relationship between the first and second nodes. For example, as depicted in FIG. 5, edges between nodes $n_i$ (66) and node $n_j$ (68) and between nodes $n_j$ (68) to $n_k$ (69), indicate particular relationships between nodes $n_j$ and node $n_i$, and between nodes $n_j$ and $n_k$. Using graph theory terminology, node $n_i$ is called the "tail" and node $n_j$ the "head" of the directed edge between nodes $n_i$ and $n_j$. Nodes $n_i$ and $n_j$ are said to be "adjacent" nodes. Node $n_i$ is referred to as being "adjacent to" node $n_j$, and node $n_j$ is referred to as being "adjacent from" node $n_i$. Node $n_j$ is also referred to as the "child" of node $n_i$, while node $n_i$ is referred to as the "parent" of node $n_j$. Likewise, node $n_j$ is the parent of node $n_k$, and node $n_k$ is the child of node $n_j$. Node $n_i$ is considered an "ancestor" of node $n_j$, while both nodes $n_i$ and $n_j$ are ancestors of node $n_k$. Node $n_k$ is a "descendant" of node $n_j$, while both nodes $n_j$ and $n_k$ are descendants of node $n_i$. The length of a path from a particular node to its descendants or ancestors determines the level of the descendants or ancestors. For example, node $n_j$ is the first level ancestor of node $n_k$, while node $n_i$ is the second level ancestor of node $n_k$. It should be apparent that a first level ancestor of a node is also the parent of the node. Likewise, node $n_j$ is the first level descendant of node $n_i$, while node $n_k$ is the second level descendant of node $n_i$. A first level descendant of a node is also the child of the node.

Figure 6:
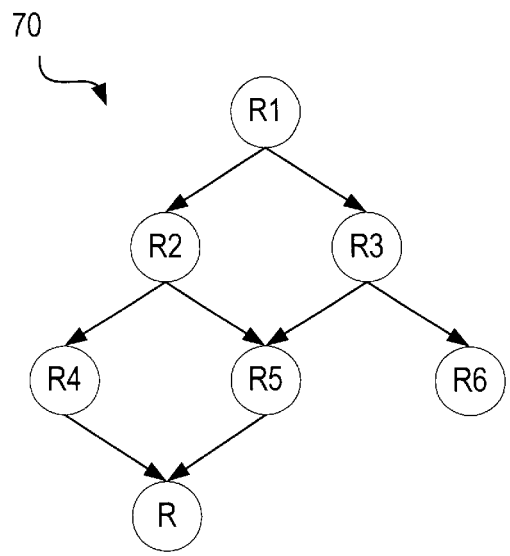
FIG. 6 depicts an exemplary directed acyclic graph representation of resource hierarchy information according to an embodiment of the present invention.

As previously stated, according to the present invention, a DAG may be used to represent resource hierarchy information such that each node of the DAG represents a resource, and a directed edge from a first resource node ($n_i$) to a second resource node ($n_j$) indicates that node $n_j$ inherits the access list information of node $n_i$ for information not contained in the access list information of node $n_j$. Generally, according to the present invention, a resource node inherits the access list information of its ancestors for information not contained in the access list of the resource node. An example of resource hierarchy DAG 70 is depicted in FIG. 6. DAG 70 represents the hierarchical relationships between a set of resources in a domain. As shown, resources "R1" and "R3" are adjacent from or descendants of resource "R1" and accordingly inherit the access list information of ancestor resource "R1." Similarly, resource "R4" is a descendant of resource "R2" and accordingly inherits the access list information of resource "R2." Since resource "R2" inherits the access list information of resource "R1", the access list information inherited by resource "R4" includes the access list information of resource "R1." Thus, resource "R4" inherits access list information from both "R1" and "R2." For example, if the access list information for resource "R1" specifically authorizes a user "U1" to perform operation "$O_1$" on "R1" and the access list information for resource "R2" specifically authorizes user "U1" to perform operation "$O_2$" on "R2", due to the resource hierarchy information, "U1" is also authorized to perform operations "$O_1$" and "$O_2$" on "R4" even though the access list information for resource "R4" may not specifically grant those permissions to user "U1." Accordingly, resource "R" inherits the access list information of resources "R1," "R2," "R3," "R4," and "R5" which are ancestor resources of resource "R." Resources "R4" and "R5" are the first level ancestor resources of resource "R," resources "R2" and "R3" the second level ancestor resources, and resource "R1" the third level ancestor resource of resource "R."

In addition to access list information and resource hierarchy information, whether or not a user can perform an operation on a resource also depends upon user hierarchy information. As previously stated, a user may typically belong to one or more groups. Positive or negative rights may be allocated to a group indicating operations which members of the group are allowed to or are prohibited from performing on one or more resource. A user belonging to a group acquires the access permissions allocated to the group.

According to the present invention, the user and the groups themselves may be configured in a hierarchical manner. The user hierarchy information describes the hierarchical relationships between the a particular user and group ancestors or user ancestors of the particular user. The user hierarchy information contains one or more principals, including the user, and is used by server 20 to determine if a user is allowed to perform an operation on the resource. The user hierarchy information is generally referred to by server 20 when a user requesting performance of an operation on a particular resource has not been specifically given positive or negative access permissions for the operation in the access list for the particular resource. Generally, according to the present invention, a user inherits access permissions of its ancestors which may be other users or groups of users.

According to one embodiment of the present invention, a DAG may be used to represent user hierarchy information such that each node of the DAG represents a group or user and a directed edge from a first node ($n_i$) to a second node ($n_j$) indicates that the group or user represented by node $n_j$ inherits operation permissions of the user or group represented by node $n_i$. The leaf node of the DAG typically represents the particular user.

Figure 7:
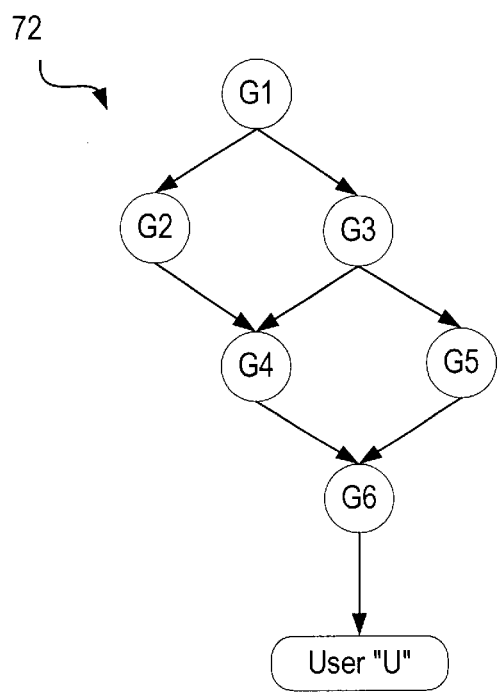
FIG. 7 depicts an exemplary directed acyclic graph representation of user hierarchy information according to an embodiment of the present invention.

An example of a directed acyclic graph (DAG) 72 storing user hierarchy information for a hypothetical user "U" is depicted in FIG. 7. As shown in DAG 72, the leaf node of the DAG represents user "U." User "U" belongs to group "G6" which is the parent or more generally the ancestor of node "U." Group "G6" is adjacent from nodes "G4" and "G5" or alternatively "G4" and "G5" are the ancestors or parents of "G6." Accordingly group "G6" inherits the access permissions of groups "G4" and "G5" in addition to its own permissions. Group node "G4" is adjacent from nodes "G2" and "G3" which in turn are adjacent from group node "G1." Using a similar analysis as above, it can be deduced that user "U" inherits the access permissions of groups "G1," "G2," "G3," "G4," "G5," and "G6" which are ancestors of user "U." Further, group "G6" is the first level ancestor, groups "G4" and "G5" the second level ancestors, groups "G2" and "G1" the third level ancestors, and group "G1" the fourth level ancestor of user "U." The user hierarchy information is generally maintained by server 20 for the various users who may access resources controlled by the server. Although FIG. 7 depicts user "U" belonging to a single group "G6," user "U" may belong to more than one group.

Figure 8:
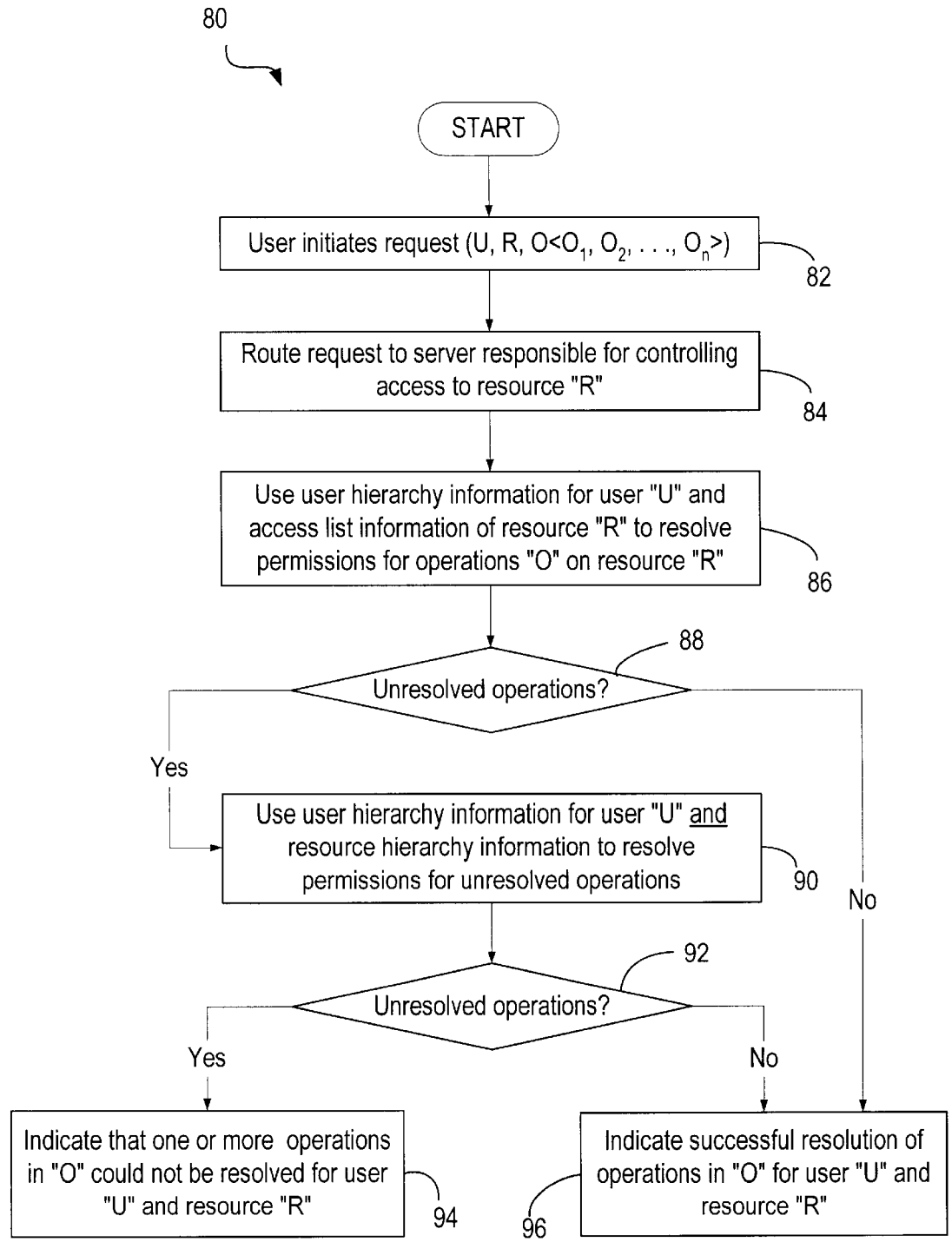
FIG. 8 depicts a simplified flow diagram for determining whether a particular user is authorized to perform one or more specified operations on a specified resource according to an embodiment of the present invention.

Based on the access list information, resource hierarchy information, and user hierarchy information described above, ACLR 22, executing on server 20, is responsible for determining whether a user can perform one or more operations on a particular resource. FIG. 8 is a simplified flow diagram 80 depicting steps performed by ACLR 22 to determine whether a particular user, or principal, is authorized to perform one or more specified operations on a specified resource. Flow diagram 80 merely illustrates an embodiment of the present invention and does not in any manner limit the claims recited herein.

As shown, flow diagram 80 is generally initiated when a user or a principal requests performance of one or more operations on a particular resource (step 82). The request generated by the user generally comprises information identifying the requesting user, information identifying the resource, and information identifying the one or more operations to be performed on the resource. In one embodiment, the request may be represented as:

Request=(U, R, O<$O_1$, $O_2$, . . . , $O_n$>)

where

"U" identifies the requesting user or principal;

"R" identifies the resource on which the operations are to be performed; and

"O" is a set of operations, $O_1$ through $O_n$, to be performed on resource "R".

The "<" and ">" symbols will be used to denote a set, for example, O<$O_1$, $O_2$, . . . , $O_n$> denotes a set "O" having set elements "$O_1$" through "$O_n$." The use of a set to denote the operations does not limit the scope of the claims recited herein. Alternate representations known to those of ordinary skill in the art may also be used to denote the collection of operations.

As previously stated, a user can generate the request using a user system 16 which may be coupled with the server controlling access to the requested resource or may be coupled with communication network 12. Irrespective of the location of the requesting user system, the request, based on the contents of the request and the location of resource "R," is routed to the appropriate server responsible for controlling access to the requested resource (step 84). Routing of requests to the controlling server is usually facilitated by a resource location table which identifies resources and their locations within computer network 10 and which is generally accessible to the various components of computer network 10.

After the request has been routed to the server responsible for controlling access to requested resource "R," ACLR 22 executing on the server initiates steps for resolving permissions for the operations specified in "O." An operation within set "O" is considered resolved if either a positive permission or a negative permission has been asserted for the operation. According to the present invention, the permissions may be specifically asserted in the access list information of the requested resource "R" or may be inherited by the user via the user hierarchy information for the user or via the resource hierarchy information, as explained below. In other words, an operation is considered resolved if the user is specifically allowed to or specifically prohibited from performing the requested operation on the requested resource. The operations set "O" is considered completely resolved if access rights for all the operations in set "O" have been resolved. The operation is considered unresolved if no such assertion has been made. If both the positive and negative permissions have been asserted, ACLR 22 may be programmed to pick either the positive or the negative permission and consider the operation resolved.

ACLR 22 attempts to resolve permissions for the operations in "O" based on information contained in the user hierarchy information for user "U" (step 86). As previously stated, the user hierarchy information represents hierarchical relationships between the user, the groups to which the user belongs, and other groups which are ancestors of user "U." In one embodiment, the user hierarchy information may be represented by a DAG with the user forming the leaf of the DAG.

ACLR 22 uses user "U" as the starting point for the permissions resolution analysis and queries the access list information for requested resource "R" to determine if the requesting user "U" has been granted positive or negative permissions for the operations in "O." As previously stated, the operations are considered resolved if positive or negative permissions have been asserted for the operations for the user. For example, in the access list information 50 depicted in FIG. 3, operations "$O_1$" and "$O_2$" are considered resolved for user "U1" since the positive permission has been specifically asserted for operation "$O_1$" and a negative permission has been specifically asserted for operation "$O_2$." However, operation "$O_3$" is unresolved since neither the positive or negative permission has been asserted.

ACLR analyzes the results from querying the access list information for resource "R" to determine if all the operations in "O" are resolved (shown in FIG. 9), or alternatively to determine if any operations in "O" are unresolved. If all the operations in "O" are resolved, ACLR 22 indicates successful completion of the operations permissions resolution process for user "U," resource "R" and operations "O" (step 96). The operations may then be performed or not performed on resource "R" based on the resolution of the operations in set "O."

If user "U" has not been granted positive or negative permissions for one or more operations in the access list information of resource "R," ACLR 22 then attempts to resolve the unresolved operations in set "O" by tracing up the user hierarchy information to determine if the groups to which the user belongs to or their ancestors have been specifically granted positive or negative permissions for the unresolved operations. Since the user inherits the access permissions from its ancestors, the access permissions of the user's ancestors are attributed to the user for the unresolved operations.

Figure 9:
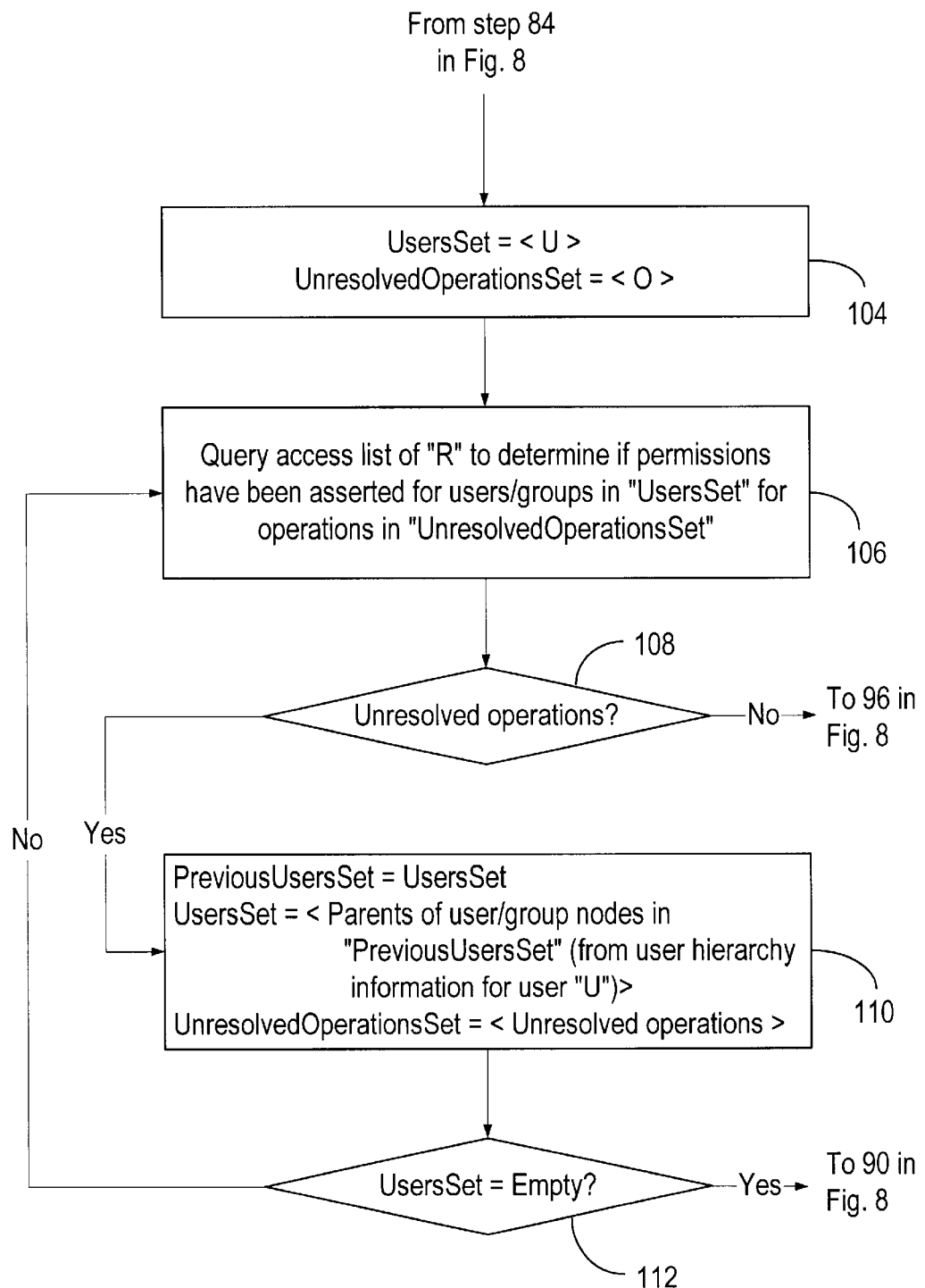
FIG. 9 depicts a simplified flow diagram for resolving operations permissions based on information contained in the user hierarchy information according to an embodiment of the present invention.

ACLR 22 determines the parents of user "U" from the user hierarchy information for user "U." The parents of "U" generally represent the groups to which the user belongs and are referred to as first level ancestors. For example, for the user hierarchy information depicted in FIG. 7, at the first level, ACLR 22 determines group "G6" to be the parent or the first level ancestor of user "U." For each of the first level ancestors, ACLR 22 queries the access list information for the requested resource "R" to determine if the first level ancestors have been granted positive or negative permissions for the unresolved operations in "O." If any of the first level ancestors have been granted specific positive or negative permissions for one or more unresolved operations, the permissions for those operations are inherited by user "U1", and those operations are considered resolved. ACLR 22 then determines if all the unresolved operations have been resolved based on the access permissions of the first level ancestors (as shown in FIG. 9).

If all the operations have not been resolved (shown in FIG. 9), ACLR 22 then determines the parents of the first level ancestors, also referred to as the second level ancestors of "U," from the user hierarchy information for user "U." For example, for the user hierarchy information depicted in FIG. 7, groups "G4" and "G5" are the second level ancestors of user "U." ACLR 22 then queries the access list information for the requested resource "R" to determine if the second level ancestors have been granted positive or negative permissions for the unresolved operations in "O." As with the first level ancestors, if any of the second level ancestors have been granted specific positive or negative permissions for one or more unresolved operations, the permissions for those operations are inherited by user "U1", and those operations are considered resolved. ACLR 22 then again determines if there are any unresolved operations (as shown in FIG. 9). The above steps of using the user hierarchy information to determine ancestors of user "U" at increasing levels and determining their operations permissions for the unresolved operations is repeated until either all operations in set "O" are resolved or until all the ancestors of user "U" have been exhausted, i.e. all the access permissions for all the users and groups in the user hierarchy information for user "U" have been queried. If there still exists some unresolved operations (step 88), ACLR proceeds to perform step 90. If all the operations in "O" are resolved, ACLR 22 indicates successful completion of the operations permissions resolution process (step 96). The operations may then be performed or alternatively not performed on resource "R" based on the resolution of the operations in set "O."

ACLR 22 proceeds to step 90 if the user hierarchy information was not sufficient to resolve all the operations in "O." At step 90, ACLR 22 attempts to resolve permissions for the unresolved operations by using information stored in the resource hierarchy information in combination with information stored in the user hierarchy information (step 90). As previously stated, the resource hierarchy information represents the hierarchical relationships between resources. The resource hierarchy information may be represented by a DAG such that a resource inherits the access list information from its ancestors. ACLR 22 attempts to resolve the unresolved operations by tracing up the resource hierarchy information to determine the ancestors of requested resource "R," and then determining if user "U" or any of its ancestors has been granted positive or negative permissions for the unresolved operations in the access list information for any of the ancestor resources. If a positive or negative permission has been asserted, the particular operation for which the permission has been asserted is considered resolved for user "U" and resource "R" since resource "R" inherits the access list information of its ancestors. If all the operations in "O" are resolved (step 92) based on the resource and user hierarchy information, ACLR 22 indicates successful completion of the operations permissions resolution process (step 96). The operations may then be performed or alternatively not performed on resource "R" based on the resolution of the operations in set "O." If all operations are not resolved, ACLR 22 indicates unsuccessful completion of the operations permissions resolution process (step 94).

For example, given the resource hierarchy information depicted in FIG. 6 and the user hierarchy information depicted in FIG. 7, since the access list information of resource "R" has already been queried, ACLR 22 determines the parents, or the first level resource ancestors, of resource "R" which are "R4" and "R5." ACLR 22 then queries the access list information for each first level resource ancestor to determine if user "U" or any of its ancestors from the user hierarchy information for user "U" has been granted positive or negative permissions for the unresolved operations. Operations for which the positive or negative permissions have been asserted for the ancestor, resources are considered resolved and those permissions are inherited by user "U" for resource "R." If all operations are not resolved based on the first level resource ancestors and the user hierarchy information for user "U," ACLR 22 determines parents of the first level resource ancestors, also referred to as the second level resource ancestors of "R," from the resource hierarchy information. For example, for the resource hierarchy depicted in FIG. 6, resources "R2" and "R3" are the second level resource ancestors of "R". ACLR 22 then queries the access list information for each second level resource ancestor to determine if user "U" or any of its ancestors from the user hierarchy information for user "U" have been granted positive or negative permissions for the unresolved operations. The above steps of determining ancestor resources or "R" and resolving permissions based on the ancestor resources and the user hierarchy information for user "U" are repeated until either all the operations in "O" have been resolved or alternatively the access list information for all the ancestor resources of resource "R" have been queried. As stated above, if all the operations in "O" are resolved (step 92), ACLR 22 indicates successful completion of the operations permissions resolution process (step 96). Else, ACLR 22 indicates that one or more operations in "O could not be resolved for user "U" and resource "R" (step 94).

FIG. 9 depicts a simplified flow diagram for resolving the operations permissions for operations in "O" using information contained in the user hierarchy information, according to an embodiment of the present invention. The steps depicted in FIG. 9 correspond to steps 86 and 88 of flow diagram 80 in FIG. 8. The flow diagram depicted in FIG. 9 merely illustrates one embodiment and does not limit the scope of the present invention. Other techniques, with alterations/modifications known to one of ordinary skill in the art are also within the scope of the present invention.

The flow diagram in FIG. 9 is initiated when ACLR 22 receives a request from user "U" to perform operations "O" on resource "R." On receiving the request, ACLR 22 initializes variables to facilitate the permissions resolution process (step 104). A "UsersSet" set variable is initialized to include user "U." The "UsersSet" set indicates the current users/groups for whom access permissions are being determined. An "UnresolvedOperationsSet" set variable includes the unresolved operations and is initialized to include all the operations in set "O," since all the operations in set "O" are unresolved at the start.

After initializing the variables, ACLR 22 queries the access list information of resource "R" to determine whether positive or negative permissions have been asserted for the users/groups in the "UsersSet" for operations specified in the "UnresolvedOperationsSet" (step 106). During the first pass of the flow diagram, since "UsersSet" contains "U," ACLR 22 determines if positive or negative permissions have been asserted for user "U" for operations in set "O" (set "UnresolvedOperationsSet" contains all the operations in set "O") in the access list information of resource "R."

ACLR 22 determines if there are any unresolved operations (step 108). If all operations in "O" have been resolved, ACLR 22 proceeds to step 96 of flow diagram 80 in FIG. 8. If permissions for all operations are not resolved, ACLR 22 reinitializes a "PreviousUsersSet" set variable to contain elements of "UsersSet." "UsersSet" is reinitialized to contain parents of the user/groups in "PreviousUsersSet" (step 110). Since the "UsersSet" initially contained "U," at step 110 during the first pass, "PreviousUsersSet" contain "U" and ACLR 22 determines the parents or first level ancestors of user "U" and stores the ancestor information in "UsersSet." The "UnresolvedOperationsSet" is also reinitialized to contain only the unresolved operations.

ACLR 22 then determines if "UsersSet" contains any elements. An empty "UsersSet" implies that all the ancestors of user "U" have been already processed and that further resolution of operations permissions will be performed using the resource hierarchy information in conjunction with the user hierarchy information, as performed in step 90 of FIG. 8.

If "UsersSet" is not empty, implying that all ancestors of user "U" have not been processed, processing continues with step 106. Since "UsersSet" now contains the first level ancestors of user "U," at step 106 during the second pass, ACLR 22 queries the access list information associated with resource "R" to determine if positive or negative permissions have been asserted for the first level ancestors. If all operations are not resolved (step 108), "PreviousUsersSet" is reinitialized to contents of "UsersSet" which are the first level ancestors, and "UsersSet" is reinitialized to contain the parents of the first level ancestors, also referred to as the second level ancestors of "U", and the "UnresolvedOperationsSet" is reinitialized with the remaining unresolved operations. Thus, with every successive pass, the "UsersSet" is initialized with ancestors of user "U" at increasing levels until the entire user hierarchy information has been traversed. Steps 106, 108, 110, and 112 are repeated until either all operations in set "O" are resolved or until all ancestors of user "U" have been processed. After the users/groups in the user hierarchy information of user "U" have been traversed and all operations have still not been resolved, processing continues with step 90 in FIG. 8.

Figure 10A:
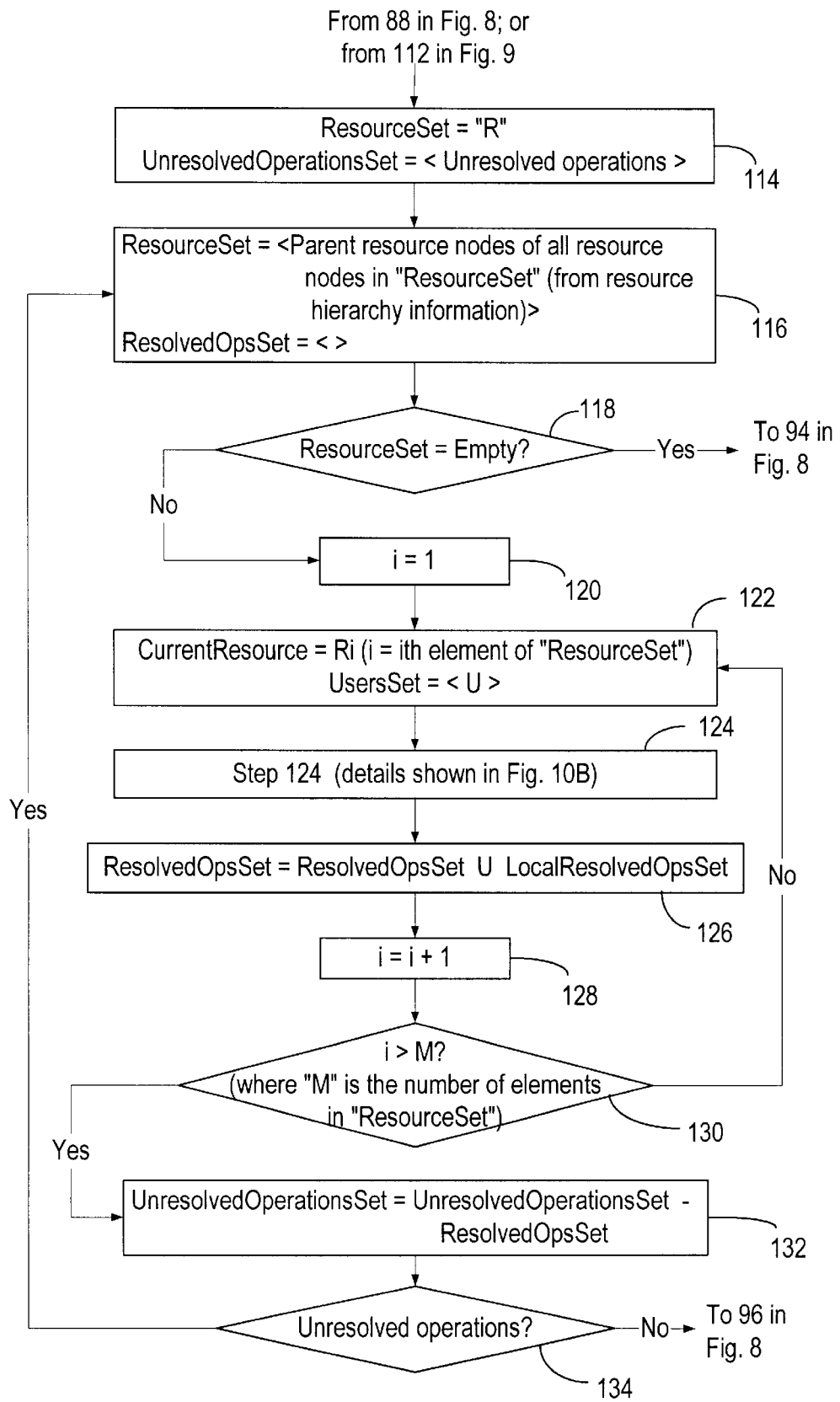
FIGS. 10A and 10B depict a simplified flow diagram for resolving operations permissions based on information contained in the user hierarchy information and information contained in the resource hierarchy information according to an embodiment of the present invention.
Figure 10B:
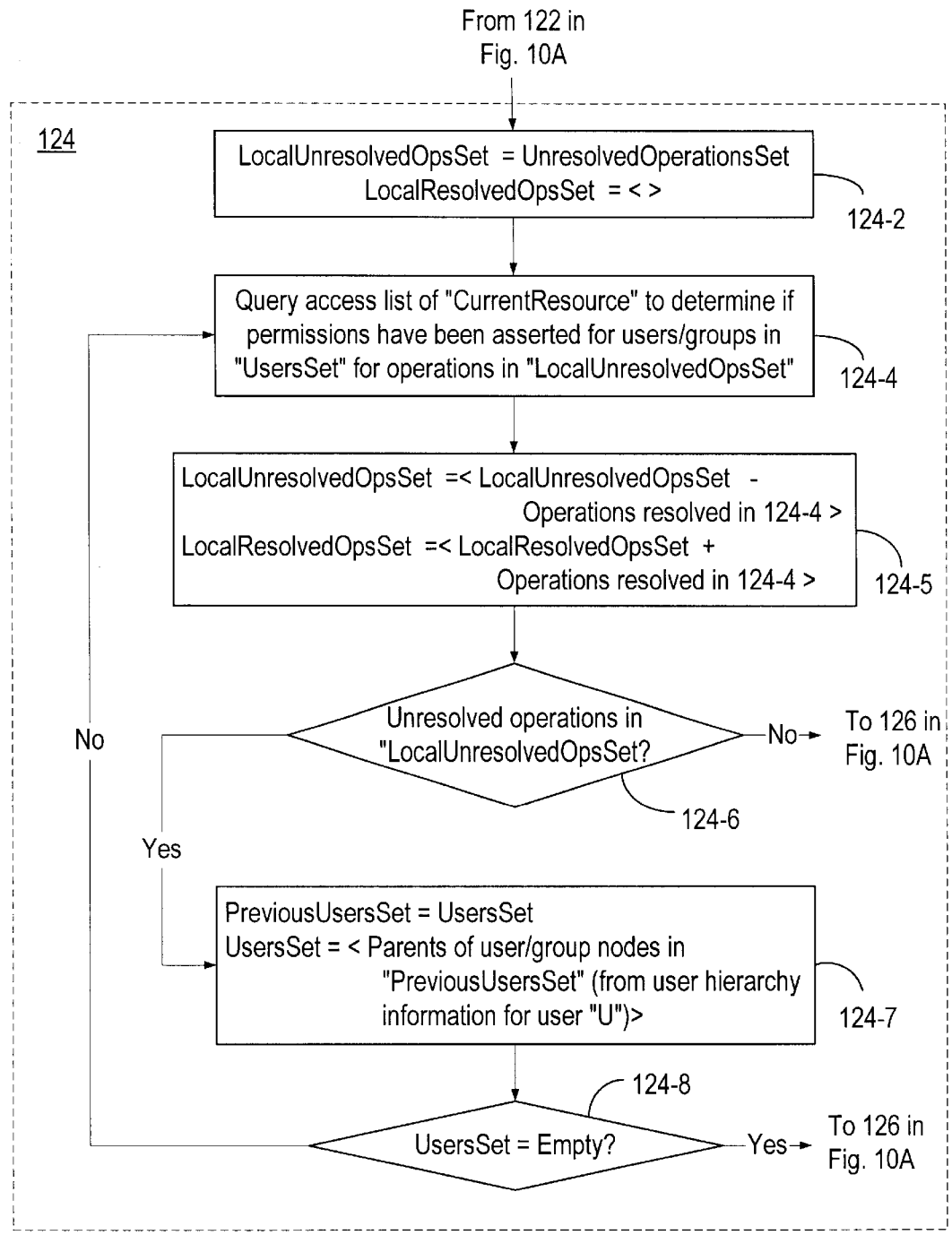

FIGS. 10A and 10B depict simplified flow diagrams for resolving operations permissions for unresolved operations in "O" using information contained in the user hierarchy information in combination with information contained in the resource hierarchy information, according to an embodiment of the present invention. The steps depicted in FIGS. 10A and 10B correspond to steps 90 and 92 of flow diagram 80 in FIG. 8. The flow diagrams depicted in FIGS. 10A and 10B merely illustrate one embodiment and do not limit the scope of the present invention. Other techniques, with alterations/modifications known to one of ordinary skill in the art are also within the scope of the present invention.

The flow diagram in FIG. 10A is initiated when the user hierarchy information for user "U" is not sufficient to resolve all the operations in set "O." To facilitate traversal of resource hierarchy information, ACLR 22 initializes a "ResourceSet" set variable to contain resource "R," and initializes the "UnresolvedOperationsSet" variable to contain only those operations in "O" which are still unresolved (step 114). The elements of set "ResourceSet" represent resources under analysis at a particular resource hierarchical level. Based on the resource hierarchy information, ACLR 22 determines the parent resources of all the resources in the "ResourceSet" and reinitializes "ResourceSet" to contain only those parent resources. (step 116). A variable set "ResolvedOpsSet" is initialized to be empty (step 116). Since "ResourceSet" initially contained "R," during the first pass, ACLR 22 "ResourceSet" includes the parents of "R," also referred to as the first level resource ancestors of resource "R." During successive passes, "ResourceSet" contains ancestor resources at increasing levels of hierarchy.

ACLR 22 then determines if "ResourceSet" is empty. An empty "ResourceSet" implies that all the ancestor resources of resource "R" have been processed and that the permissions for all the operations in "O" could not be fully resolved. If "ResourceSet" is empty, ACLR 22 proceeds to step 94 in flow diagram 80 in FIG. 8. If "ResourceSet" is not empty, then ACLR initializes a counter to iterate through the elements of "ResourceSet" (step 120). A "CurrentResource" element is initialized to the i$^{th}$ element of "ResourceSet." The "UsersSet" set is reinitialized to contain only user "U" (step 122). Processing then proceeds with step 124, the details of which are depicted in FIG. 10B.

In step 124, depicted in FIG. 10B, ACLR 22 traverses the user hierarchy information to determine if positive or negative permissions have been asserted for principals in the user hierarchy for user "U" for unresolved operations on resource "CurrentResource." To facilitate the permissions resolution process, ACLR 22 initializes a set variable "LocalUnresolvedOpsSet" to contain the unresolved operations from set "UnresolvedOperationsSet," and initializes a set variable "LocalResolvedOpsSet" to be empty (step 124-2).

ACLR 22 then queries the access list information of "CurrentResource" to determine if positive or negative permissions have been asserted for the users/groups in "UsersSet" for the unresolved operations contained in "LocalUnresolvedOpsSet." During the first pass, "UsersSet" contains user "U." During successive passes, "UsersSet" contains ancestors of user "U" at increasing levels, thus traversing the user hierarchy information. Based on the results of step 124-4, ACLR 22 adds the operations which were in step 124-4 resolved to the set "LocalResolvedOpsSet" and removes the operations resolved in step 124-4 from the set "LocalUnresolvedOpsSet" (step 124-5).

ACLR 22 then determines if there are any unresolved operations in the set "LocalUnresolvedOpsSet" (step 124-6). If all operations in "LocalUnresolvedOpsSet" have been resolved, processing continues with step 126 in FIG. 10A. If all operations in "LocalUnresolvedOpsSet" are not resolved, ACLR 22 reinitializes a "PreviousUsersSet" to contain elements of "UsersSet." "UsersSet" is reinitialized to contain only parents of the users/groups in "PreviousUsersSet." (step 124-7).

ACLR 22 then determines if "UsersSet" contains any elements (step 124-8). If "UsersSet" is not empty, the flow diagram continues with step 124-4. Steps 124-4, 124-5, 124-6, 124-7, and 124-8 are repeated until either all unresolved operations in "LocalUnresolvedOpsSet" have been resolved or until all the principals in the user hierarchy information for user "U" have been processed with respect to "CurrentResource." An empty "UsersSet" implies that all the ancestors of user "U" have been processed for the "CurrentResource," and processing then proceeds to step 126 depicted in FIG. 10A.

At step 126 in FIG. 10A, ACLR 22 accumulates the operations resolved for the current resource hierarchy level. The accumulation is accomplished by taking a union of the "ResolvedOpsSet" and the "LocalResolvedOpsSet" (from FIG. 10B). The "ResolvedOpsSet" thus accumulates the resolved operations for ancestor resources at the same level from resource "R." If a resolved operation exists in both "ResolvedOpsSet" and "LocalResolvedOpsSet" with differing permissions, ACLR 22 can be programmed to select a particular permission as the selected permission for the operation in the "ResolvedOpsSet." For example, ACLR 22 may be programmed to select a positive permission over a negative permission.

ACLR 22 then increments the counter variable by one (step 128). A check is then made to determine if all the elements of set "ResourceSet" have been processed, or in other words, if all the resources at a particular level have been processed (step 130). If all the elements of "ResourceSet" have been processed (i.e. "'i>M" where M=total number of elements in "ResourceSet"), processing continues to step 132, else processing continues with step 122 wherein the next element of "ResourceSet" is selected for processing. Steps 122, 124, 126, 128, and 130 are repeated until all the elements in set "ResourceSet" have been processed for a resource hierarchy level.

At step 132, ACLR 22 updates the contents of set "UnresolvedOperationsSet" by removing from the set the resolved operations contained in set "ResolvedOpsSet." Set "UnresolvedOperationsSet" now only contains operations from "O" which have yet to be resolved. ACLR 22 then determines if all the operations in "O" have been resolved or if the "UnresolvedOperationsSet" is empty (step 134). If all operations in "O" have been resolved, processing proceeds to step 96 in FIG. 8. If all operations in "O" are not resolved, processing continues with step 116 wherein ACLR 22 reinitializes "ResourceSet" with the parent resources of the "ResourceSet" elements. The set "ResolvedOpsSet" is also reinitialized to be empty.

Steps 116, 118, 120, 122, 124, 126, 128, 130, 132, and 134 are repeated until either all operations in "O" have been resolved or until all the ancestors of resource "R" have been processed. In this manner, ACLR attempts to resolve operations permissions for the unresolved operations by querying the access list information for each of the ancestor resources of "R" to determine if user "U" or any of its ancestors have been granted positive or negative permissions for the unresolved operations. If a positive or negative permission has been asserted, the particular operation for which the permission has been asserted is considered resolved for resource "R" since resource "R" inherits the access list information of its ancestor resources.

The present invention provides an efficient mechanism for controlling access to resources in a distributed environment. The ability to specify positive and negative permissions coupled with the hierarchical nature of resource and user hierarchy information, and further coupled with the manner in which operations permissions are resolved using information stored in the user hierarchy and resource hierarchy information, allows an access controller to control access to resources in a easy to use manner which not only provides for fine granularity of control but is also scalable as the number of users, resources, and the operations which can be performed on the resources increases in a distributed environment.

For example, consider two users "U1" and "U2" belonging to a group "G" which has permissions to perform a plurality of operations including an operation "$O_1$" on a resource "R." Now lets assume that it was desired that the permissions granted to "U1" and "U2" be downgraded such that "U1" and "U2" would have all the permissions of group "G" but be prohibited from performing operation "$O_1$" on resource "R" and descendant resources of "R."

Using conventional access control techniques, in order to downgrade the permissions, users "U1" and "U2" would first have to be removed from group "G." A separate group "$G_{new}$" would then have to be created containing users "U1" and "U2" and granted all the permissions of group "G" minus the permission to perform operation "O1" on resource "R." Finally, a new entry would have to be created in the access control information of resource "R" for group "$G_{new}$" granting permissions to perform the operations which group "G" was authorized to perform minus operation "$O_1$." Similar procedures will have to be repeated for each of "R's" descendants.

As is evident from the preceding explanation, even a simple task of changing downgrading permissions for a couple of users using conventional techniques may involve a complex sequence of several steps including changing membership of an existing group, forming a new group, granting rights to the new group, changing the access list of the resource, and granting rights to the new group. Further, the complexity is exponentially magnified in a distributed environment comprising several groups, resources, and operations.

However, according to the present invention, the same task described above can be achieved using less steps than conventional techniques. According to the present invention, the permissions for "U1" and "U2" could be downgraded by simply amending the access control list of resource "R" to include "U1" and "U2" and asserting the negative permissions for "U1" and "U2" with respect to operation "$O_1$." Due to the manner in which permissions are resolved according to the present invention, "U1" and "U2" would be prohibited from performing operation "O1" but at the same time would inherit all the other permissions from group "G" which is an ancestor of users "U1" and "U2." Thus, unlike conventional techniques, according to the present invention, no existing groups have to be modified nor new groups created. Further, no changes have to be made to the access list information of "R's" descendants.

As shown by the above example, the present invention allows easy customization of user permissions and as a result provides fine grained access control with respect to operations which users can perform on resources. At the same time, the present invention reduces the level of complexity typically associated with conventional resource access control mechanisms. Reduced complexity translates to increased ease of use and ease of maintaining and administering resources across a distributed computer network. Additionally, by distributing the resource access control tasks among the various servers coupled with the resources, the present invention is easily scalable as the number as the number of users, resources, and requests increases.

Although specific embodiments of the invention have been described, various modifications, alterations, alternative constructions, and equivalents are also encompassed within the scope of this application. For example, the embodiment of the present invention described above first attempts to resolve the operations permissions using information stored in the user hierarchy information, and if that is not sufficient to resolve all the operations, then attempts to resolve the operations permissions using information from the resource hierarchy in combination with information from the user hierarchy. In other embodiments of the present invention, the resource hierarchy information may be initially used to resolve the operations permissions, and if that is not sufficient to resolve all the operations, then resolution of the permissions may be attempted using the resource hierarchy information in combination with the user hierarchy information. Thus, according to the present invention, resource hierarchy information or user hierarchy information may be initially used to resolve the operations permissions before a combination of the resource hierarchy and user hierarchy information is used.

The described invention is not restricted to operation within certain specific data processing environments, but is free to operate within a plurality of data processing environments. For example, although the present invention has been described in computer network environment, the present invention may also be incorporated in a single stand-alone computer system. Additionally, although the present invention has been described using a particular series of transactions and steps, it should be apparent to those skilled in the art that the scope of the present invention is not limited to the described series of transactions and steps. It should be apparent that the example described above merely illustrates some of the advantages offered by the present invention in a particular context and does not in any way limit the scope of the invention as recited in the claims.

Further, while the present invention has been described using a particular combination of hardware and software, it should be recognized that other combinations of hardware and software are also within the scope of the present invention. The present invention may be implemented only in hardware or only in software or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope of the invention as set forth in the claims.

What is claimed is:

1. A computer implemented method for determining if a particular user is authorized to perform an operation on a particular resource, the method comprising:

providing access list information for the particular resource;

providing user hierarchy information for the particular user, the user hierarchy information comprising information on hierarchy relationships between principals which include the particular user and the user's ancestors; and determining if a permission has been asserted for the operation based on the user hierarchy information and the access list information for the particular resource wherein determining if the permission is asserted for the operation based on the user hierarchy information and the access list information for the particular resource comprises:

(a) initializing a first collection to include the particular user;

(b) determining if the permission is asserted for the operation in the access list information of the particular resource for any of the members of the first collection;

(c) if the permission is not asserted, initializing a second collection to include members of the first collection, and reinitializing the first collection, based on the user hierarchy information, to include parents of the members in the second collection;

(d) if the permission is not asserted, repeating steps (b) and (c) while the permission is not asserted and the first collection includes at least one ancestor of the particular user; and (e) if the permission is asserted, attributing the permission to the particular user for the operation to be performed on the particular resource.

2. The method of claim 1 wherein the permission for the operation is a positive permission indicating that the particular user is authorized to perform the operation on the particular resource, or a negative permission indicating that the particular user is prohibited from performing the operation on the particular resource.

3. The method of claim 1 wherein the access list information for the particular resource includes information indicating operations which can be performed on the resource, users which can perform operations on the resource, and permissions for the users and operations.

4. The method of claim 1 wherein determining if the permission has been asserted for the operation based on the user hierarchy information and the access list information for the particular resource comprises:

determining if the permission is asserted for the operation in the access list information of the particular resource for the particular user;

if the permission is not asserted:

determining ancestors of the particular user from the user hierarchy information;

determining if the permission is asserted for the operation in the access list information of the particular resource for any of the ancestors; and if the permission is asserted for the operation in the access list information of the resource for any of the ancestors, attributing the permission to the particular user for the operation to be performed on the particular resource; and if the permission is asserted for the operation in the access list information of the particular resource, attributing the permission to the particular user for the operation to be performed on the particular resource.

5. The method of claim 1 wherein determining if the permission has been asserted for the operation based on the user hierarchy information and the access list information for the particular resource comprises:

determining if the permission is asserted for the operation in the access list information of the particular resource for the particular user;

if the permission is not asserted:

(a) initializing a first variable to indicate a first level;

(b) determining ancestors of the particular user from the user hierarchy information at a level indicated by the first variable;

(c) determining if the permission is asserted for the operation in the access list information of the particular resource for the ancestors determined in step (b);

(d) if the permission is not asserted, incrementing the first variable by one level;

(e) repeating (b), (c), and (d) while the permission is not asserted and the user hierarchy information comprises ancestors of the particular user at the level indicated by the first variable; and (f) if the permission is asserted, attributing the permission to the particular user for the operation to be performed on the particular resource.

6. The method of claim 1 further comprising:

if it cannot be determined if the permission is asserted based on the user hierarchy information and the access list information:

providing resource hierarchy information describing hierarchical relationships between the particular resource and the particular resource's ancestor resources;

providing access list information for the resources in the resource hierarchy information; and determining if the permission is asserted for the operation based on the user hierarchy information, the resource hierarchy information, and access list information for the resources in the resource hierarchy information.

7. The method of claim 6 wherein determining if the permission is asserted for the operation based on the user hierarchy information, the resource hierarchy information, and access list information for the resources in the resource hierarchy information comprises:

determining ancestor resources of the particular resource from the resource hierarchy information;

determining if the permission is asserted for the operation in the access list information of any of the ancestor resources for any of the principals in the user hierarchy information for the particular user; and if the permission is asserted, attributing the permission to the particular user for the operation to be performed on the particular resource.

8. The method of claim 6 wherein determining if the permission is asserted for the operation based on the user hierarchy information, the resource hierarchy information, and access list information for the resources in the resource hierarchy information comprises:

(a) initializing a first variable to indicate a first resource level;

(b) determining ancestor resources of the particular resource from the resource hierarchy information at a level indicated by the first variable;

(c) determining if the permission is asserted for the operation in the access list information of the ancestor resources determined in (b) for the principals in the user hierarchy information for the particular user;

(d) if the permission is not asserted, incrementing the first variable by one resource level;

(e) repeating (b), (c), and (d) while the permission is not asserted and the resource hierarchy information comprises ancestor resources of the particular resource at the level indicated by the first variable; and (f) if the permission is asserted, attributing the permission to the particular user for the operation to be performed on the particular resource.

9. A computer implemented method for determining if a particular user is authorized to perform an operation on a particular resource, the method comprising:

providing resource hierarchy information describing hierarchical relationships between the particular resource and the particular resource's ancestor resources;

providing access list information for the resources in the resource hierarchy information; and determining if a permission is asserted for the operation based on the resource hierarchy information and access list information for the resources in the resource hierarchy information;

wherein determining if the permission has been asserted for the operation based on the resource hierarchy information and the access list information for the resources in the resource hierarchy information comprises:

determining if the permission is asserted for the operation in the access list information of the particular resource for the particular user;

if the permission is not asserted:

(a) initializing a first variable to indicate a first resource level;

(b) determining ancestor resources of the particular resource from the resource hierarchy information at a level indicated by the first variable;

(c) determining if the permission is asserted for the operation in the access list information of the ancestor resources determined in step (b) for the particular user;

(d) if the permission is not asserted, incrementing the first variable by one level;

(e) repeating (b), (c), and (d) while the permission is not asserted and the resource hierarchy information comprises ancestor resources of the particular resource at the level indicated by the first variable; and (f) if the permission is asserted, attributing the permission to the particular user for the operation to be performed on the particular resource.

10. The method of claim 9 wherein the permission for the operation is a positive permission indicating that the particular user is authorized to perform the operation on the particular resource, or a negative permission indicating that the particular user is prohibited from performing the operation on the particular resource.

11. The method of claim 9 wherein the access list information for the resources includes information indicating operations which can be performed on the resources, users which can perform operations on the resources, and permissions for the users and operations.

12. The method of claim 9 wherein determining if the permission has been asserted for the operation based on the resource hierarchy information and the access list information for the resources in the resource hierarchy information comprises:

determining if the permission is asserted for the operation in the access list information of the particular resource for the particular user;

if the permission is not asserted:

determining ancestor resources of the particular resource from the resource hierarchy information;

determining if the permission is asserted for the operation in the access list information of the ancestor resources for the particular user; and if the permission is asserted for the operation in the access list information of the ancestor resources for the particular user, attributing the permission to the particular user for the operation to be performed on the particular resource; and if the permission has been set for the user for the operation in the access list information of the particular resource, attributing the permission to the particular user for the operation to be performed on the particular resource.

13. The method of claim 9 wherein determining if the permission is asserted for the operation based on the resource hierarchy information and the access list information for the resources in the resource hierarchy information comprises:

(a) initializing a first resource collection to include the particular resource;

(b) determining if the permission is asserted for the operation in the access list information of the members of the first collection for the particular user;

(c) if the permission is not asserted, initializing a second resource collection to include only members of the first collection, and reinitializing the first resource collection, based on the resource hierarchy information, to include only parents of the members in the second resource collection;

(d) if the permission is not asserted, repeating steps (b) and (c) while the permission is not asserted and the first resource collection includes at least one ancestor resource of the particular resource; and (e) if the permission is asserted, attributing the permission to the particular user for the operation to be performed on the particular resource.

14. The method of claim 9 further comprising:

if it cannot be determined if the permission is asserted based on the resource hierarchy information and the access list information of the resources in the resource hierarchy information:

providing user hierarchy information for the particular user, the user hierarchy information comprising information on hierarchical relationships between principals which include the particular user and the user's ancestors; and determining if the permission has been asserted for the operation based on the user hierarchy information, the resource hierarchy information, and the access list information for the resources in the resource hierarchy information.

15. The method of claim 14 wherein determining if the permission is asserted for the operation based on the user hierarchy information, the resource hierarchy information, and access list information for the resources in the resource hierarchy information comprises:

determining ancestors of the particular user from the user hierarchy information;

determining if the permission is asserted for the operation in the access list information of the particular resource and ancestor resources of the particular for ancestors of the particular user; and if the permission is asserted, attributing the permission to the particular user for the operation to be performed on the particular resource.

16. The method of claim 14 wherein determining if the permission is asserted for the operation based on the user hierarchy information, the resource hierarchy information, and access list information for the resources in the resource hierarchy information comprises:

(a) initializing a first variable to indicate a first user level;

(b) determining ancestors of the particular user from the resource hierarchy information at a level indicated by the first variable;

(c) determining if the permission is asserted for the operation in the access list information of the resources in the resource hierarchy information for the ancestors of the particular user determined in (b);

(d) if the permission is not asserted, incrementing the first variable by one user level;

(e) repeating (b), (c), and (d) while the permission is not asserted and the user hierarchy information comprises ancestors of the particular user at the level indicated by the first variable; and (f) if the permission is asserted, attributing the permission to the particular user for the operation to be performed on the particular resource.

17. A computer program product for a computer system including a processor and a memory for determining if a particular user is authorized to perform an operation on a particular resource, the program product comprising:

code for providing access list information for the particular resource;

code for providing user hierarchy information for the particular user, the user hierarchy information comprising information on hierarchical relationships between principals which include the particular user and the user's ancestors;

code for determining if a permission has been asserted for the operation based on the user hierarchy information and the access list information for the particular resource; and a computer-readable medium for storing the codes;

wherein the code for determining if the permission has been asserted for the operation based on the user hierarchy information and the access list information for the particular resource comprises:

code for determining if the permission is asserted for the operation in the access list information of the particular resource for the particular user;

if the permission is not asserted:

(a) code for initializing a first variable to indicate a first level;

(b) code for determining ancestors of the particular user from the user hierarchy information at a level indicated by the first variable;

(c) code for determining if the permission is asserted for the operation in the access list information of the particular resource for the ancestors determined in step (b);

(d) if the permission is not asserted, code for incrementing the first variable by one level;

(e) code for repeating (b), (c), and (d) while the permission is not asserted and the user hierarchy information comprises ancestors of the particular user at the level indicated by the first variable; and (f) if the permission is asserted, code for attributing the permission to the particular user for the operation to be performed on the particular resource.

18. The computer program product of claim 17 wherein the code for determining if the permission has been asserted for the operation based on the user hierarchy information and the access list information for the particular resource comprises:

code for determining if the permission is asserted for the operation in the access list information of the particular resource for the particular user;

if the permission is not asserted:

code for determining ancestors of the particular user from the user hierarchy information;

code for determining if the permission is asserted for the operation in the access list information of the particular resource for any of the ancestors; and if the permission is asserted for the operation in the access list information of the resource for any of the ancestors, code for attributing the permission to the particular user for the operation to be performed on the particular resource; and if the permission is asserted for the operation in the access list information of the particular resource, code for attributing the permission to the particular user for the operation to be performed on the particular resource.

19. The computer program product of claim 17 wherein the code for determining if the permission is asserted for the operation based on the user hierarchy information and the access list information for the particular resource comprises:

(a) code for initializing a first collection to include the particular user;

(b) code for determining if the permission is asserted for the operation in the access list information of the particular resource for any of the members of the first collection;

(c) if the permission is not asserted, code for initializing a second collection to include members of the first collection, and code for reinitializing the first collection, based on the user hierarchy information, to include parents of the members in the second collection;

(d) if the permission is not asserted, code for repeating steps (b) and (c) while the permission is not asserted and the first collection includes at least one ancestor of the particular user; and (e) if the permission is asserted, code for attributing the permission to the particular user for the operation to be performed on the particular resource.

20. The computer program product of claim 17 further comprising:

if it cannot be determined if the permission is asserted based on the user hierarchy information and the access list information:

code for providing resource hierarchy information describing hierarchical relationships between the particular resource and the particular resource's ancestor resources;

code for providing access list information for the resources in the resource hierarchy information; and code for determining if the permission is asserted for the operation based on the user hierarchy information, the resource hierarchy information, and access list information for the resources in the resource hierarchy information.

21. The computer program product of claim 20 wherein the code for determining if the permission is asserted for the operation based on the user hierarchy information, the resource hierarchy information, and access list information for the resources in the resource hierarchy information comprises:

code for determining ancestor resources of the particular resource from the resource hierarchy information;

code for determining if the permission is asserted for the operation in the access list information of any of the ancestor resources for any of the principals in the user hierarchy information for the particular user; and if the permission is asserted, code for attributing the permission to the particular user for the operation to be performed on the particular resource.

22. The computer program product of claim 20 wherein the code for determining if the permission is asserted for the operation based on the user hierarchy information, the resource hierarchy information, and access list information for the resources in the resource hierarchy information comprises:

(a) code for initializing a first variable to indicate a first resource level;

(b) code for determining ancestor resources of the particular resource from the resource hierarchy information at a level indicated by the first variable;

(c) code for determining if the permission is asserted for the operation in the access list information of the ancestor resources determined in (b) for the principals in the user hierarchy information for the particular user;

(d) if the permission is not asserted, code for incrementing the first variable by one resource level;

(e) code for repeating (b), (c), and (d) while the permission is not asserted and the resource hierarchy information comprises ancestor resources of the particular resource at the level indicated by the first variable; and (f) if the permission is asserted, code for attributing the permission to the particular user for the operation to be performed on the particular resource.

23. A computer program product for a computer system including a processor and a memory for determining if a particular user is authorized to perform an operation on a particular resource, the program product comprising:

code for providing resource hierarchy information describing hierarchical relationships between the particular resource and the particular resource's ancestor resources;

code for providing access list information for the resources in the resource hierarchy information;

code for determining if a permission is asserted for the operation based on the resource hierarchy information and access list information for the resources in the resource hierarchy information; and a computer-readable medium for storing the codes;

wherein the code for determining if the permission has been asserted for the operation based on the resource hierarchy information and the access list information for the resources in the resource hierarchy information comprises:

code for determining if the permission is asserted for the operation in the access list information of the particular resource for the particular user;

if the permission is not asserted:

(a) code for initializing a first variable to indicate a first resource level;

(b) code for determining ancestor resources of the particular resource from the resource hierarchy information at a level indicated by the first variable;

(c) code for determining if the permission is asserted for the operation in the access list information of the ancestor resources determined in step (b) for the particular user;

(d) if the permission is not asserted, code for incrementing the first variable by one level;

(e) code for repeating (b), (c), and (d) while the permission is not asserted and the resource hierarchy information comprises ancestor resources of the particular resource at the level indicated by the first variable; and (f) if the permission is asserted, code for attributing the permission to the particular user for the operation to be performed on the particular resource.

24. The computer program product of claim 23 wherein the code for determining if the permission has been asserted for the operation based on the resource hierarchy information and the access list information for the resources in the resource hierarchy information comprises:

code for determining if the permission is asserted for the operation in the access list information of the particular resource for the particular user;

if the permission is not asserted:

code for determining ancestor resources of the particular resource from the resource hierarchy information;

code for determining if the permission is asserted for the operation in the access list information of the ancestor resources for the particular user; and if the permission is asserted for the operation in the access list information of the ancestor resources for the particular user, code for attributing the permission to the particular user for the operation to be performed on the particular resource; and if the permission has been set for the user for the operation in the access list information of the particular resource, code for attributing the permission to the particular user for the operation to be performed on the particular resource.

25. The computer program product of claim 23 wherein the code for determining if the permission is asserted for the operation based on the resource hierarchy information and the access list information for the resources in the resource hierarchy information comprises:

(a) code for initializing a first resource collection to include the particular resource;

(b) code for determining if the permission is asserted for the operation in the access list information of the members of the first collection for the particular user;

(c) if the permission is not asserted, code for initializing a second resource collection to include only members of the first collection, and code for reinitializing the first resource collection, based on the resource hierarchy information, to include only parents of the members in the second resource collection;

(d) if the permission is not asserted, code for repeating steps (b) and (c) while the permission is not asserted and the first resource collection includes at least one ancestor resource of the particular resource; and (e) if the permission is asserted, code for attributing the permission to the particular user for the operation to be performed on the particular resource.

26. The computer program product of claim 23 further comprising:

if it cannot be determined if the permission is asserted based on the resource hierarchy information and the access list information of the resources in the resource hierarchy information:

code for providing user hierarchy information for the particular user, the user hierarchy information comprising information on hierarchical relationships between principals which include the particular user and the user's ancestors; and code for determining if the permission has been asserted for the operation based on the user hierarchy information, the resource hierarchy information, and the access list information for the resources in the resource hierarchy information.

27. The computer program product of claim 26 wherein the code for determining if the permission is asserted for the operation based on the user hierarchy information, the resource hierarchy information, and access list information for the resources in the resource hierarchy information comprises:

code for determining ancestors of the particular user from the user hierarchy information;

code for determining if the permission is asserted for the operation in the access list information of the particular resource and ancestor resources of the particular for ancestors of the particular user; and if the permission is asserted, code for attributing the permission to the particular user for the operation to be performed on the particular resource.

28. The computer program product of claim 26 wherein the code for determining if the permission is asserted for the operation based on the user hierarchy information, the resource hierarchy information, and access list information for the resources in the resource hierarchy information comprises:

(a) code for initializing a first variable to indicate a first user level;

(b) code for determining ancestors of the particular user from the resource hierarchy information at a level indicated by the first variable;

(c) code for determining if the permission is asserted for the operation in the access list information of the resources in the resource hierarchy information for the ancestors of the particular user determined in (b);

(d) if the permission is not asserted, code for incrementing the first variable by one user level;

(e) code for repeating (b), (c), and (d) while the permission is not asserted and the user hierarchy information comprises ancestors of the particular user at the level indicated by the first variable; and (f) if the permission is asserted, code for attributing the permission to the particular user for the operation to be performed on the particular resource.

* * * * *